(12) United States Patent
Nichols et al.

(10) Patent No.: US 11,874,501 B1
(45) Date of Patent: Jan. 16, 2024

(54) SYSTEMS AND METHODS TO MAINTAIN PHASE RELATIONS OF AN OPTICAL SIGNAL IN A PHOTONIC DOT PRODUCT ENGINE

(71) Applicants: HUAWEI TECHNOLOGIES CANADA CO., LTD., Kanata (CA); Queen's University at Kingston, Kingston (CA); The University of British Columbia, Vancouver (CA)

(72) Inventors: Mitchell Nichols, Surrey (CA); Enxiao Luan, Vancouver (CA); Mahsa Salmani, Vaughan (CA); Armaghan Eshaghi, Newmarket (CA); Lutz Hans-Joachim Lampe, Vancouver (CA)

(73) Assignees: HUAWEI TECHNOLOGIES CANADA CO., LTD., Kanata (CA); QUEEN'S UNIVERSITY AT KINGSTON, Kingston (CA); THE UNIVERSITY OF BRITISH COLUMBIA, Vancouver (CA)

( * ) Notice: Subject to any disclaimer, the term of this patent is extended or adjusted under 35 U.S.C. 154(b) by 0 days.

(21) Appl. No.: 17/891,276

(22) Filed: Aug. 19, 2022

(51) Int. Cl.
*G02B 6/293* (2006.01)
*H04J 14/02* (2006.01)
*G06E 3/00* (2006.01)

(52) U.S. Cl.
CPC ..... *G02B 6/29383* (2013.01); *G02B 6/29338* (2013.01); *G02B 6/29395* (2013.01);
(Continued)

(58) Field of Classification Search
CPC ............ G02B 6/29383; G02B 6/29338; G02B 6/29395; G06E 3/001; H04J 14/0202; H04J 14/021
See application file for complete search history.

(56) References Cited

U.S. PATENT DOCUMENTS

| 10,670,860 B2 | 6/2020 | Tait et al. |
| 2020/0279585 A1 | 9/2020 | Rothschild |
| 2021/0405308 A1 * | 12/2021 | Bhargava ............. G02B 27/283 |

FOREIGN PATENT DOCUMENTS

CN 114358271 A * 4/2022

OTHER PUBLICATIONS

Schwelb, "Transmission, Group Delay, and Dispersion in Single-Ring Optical Resonators and Add/Drop Filters—A Tutorial Overview" Journal of Lightwave Technology, vol. 22, No. 5, pp. 1380-1394, May 2004.

(Continued)

*Primary Examiner* — Leslie C Pascal

(57) ABSTRACT

A photonic device configured to perform matrix vector multiplication operations at high frequencies is provided. The vector being multiplied by the matrix is defined by vector components at specific wavelengths. The device includes a first waveguide and a second waveguide. A series of tunable microring resonators (MRRs) are coupled to the first waveguide and to a respective series of passive delay rings (PDRs), which are coupled to the second waveguide. Each MRR/PDR pair defines a tunable matrix component (tunable weight) for a respective wavelength component of the vector. A series of controllable delay elements (CDEs) such as all-pass filters are coupled to the first waveguide, upstream from the tunable MRRs. Any tuning dependent group delay caused by the MRR/PDR pairs can be compensated by controlling the CDEs such that each wavelength components has substantially a same delay as the other wavelength components.

20 Claims, 13 Drawing Sheets

(52) U.S. Cl.
CPC ............ *G06E 3/001* (2013.01); *H04J 14/021* (2013.01); *H04J 14/0202* (2013.01)

(56) References Cited

OTHER PUBLICATIONS

Tait et al., "Microring Weight Banks" IEEE Journal of Selected Topics in Quantum Electronics, vol. 22, No. 6, pp. 312-325, Nov. 2016.

\* cited by examiner

SYSTEMS AND METHODS TO MAINTAIN PHASE RELATIONS OF AN OPTICAL SIGNAL IN A PHOTONIC DOT PRODUCT ENGINE

CROSS-REFERENCE TO RELATED APPLICATIONS

This is the first application filed for the present invention.

TECHNICAL FIELD OF THE INVENTION

This present disclosure pertains generally to optical computing devices and in particular, to systems and methods to improve the accuracy of mathematical operations performed optically.

BACKGROUND

Matrix-vector multiplication (MVM) is a fundamental operation for computing solutions to systems of linear equations that arise in many machine learning and signal processing applications, such as convolutional neural networks and beamforming. With increasing demand for computing capabilities, analog implementations of MVM can overcome the limitations of digital electronics, including those of power consumption and bandwidth. MVM can be decomposed into a set of multiply-accumulate (MAC) operations, or dot products. Multiple instances of an analog dot product engine (DPE) implementing a MAC operation with programmable weights can efficiently be used to perform any MVM. An analog MVM can be implemented in the optical domain by modulating the input vector onto a set of optical carrier signals and performing the analog MVM using a photonic signal processor. Optical implementations of MVM can provide significant performance benefits over electronic components. Moreover, photonic circuits are immune to electromagnetic interference.

Devices that perform incoherent optical matrix-vector multiplication (MVM) are known and typically have an input port, a through port and a drop port. The output port and the through port are coupled to a balanced photodetector, which requires that the through port and the drop port to be next to one another and have their output optical signals exiting the through port and the drop port in the same direction.

Microring resonator (MRR) weight banks are known and can be used for weighed addition of vector input signal encoded on a set of wavelength-division multiplexed optical carriers. However, one of the disadvantages of using single MRR weight banks is that light output at the through port is in a direction opposite to that of the light output at the drop port. It is possible to redirect the light of the drop port in the same direction as the light of the through port by using a half-loop waveguide. This causes the optical signal output at the drop port to propagate in the same direction as the optical signal output from the through port. However, the optical signal output at the drop port is delayed in relation to the optical signal output at the through port. This can be a significant problem if the optical signal at the input port has a wide bandwidth. Additionally, this delay can vary greatly over the tuning range of the single MRR, which can limit the performance of the single MRR in terms of bandwidth for baseband signal and realized weights at higher frequency signals.

SUMMARY

Embodiments of the present disclosure provide for a photonic device configured to perform matrix vector multiplications in accordance with weight settings defined by tunable add-drop filters. The photonic device may comprise controllable optical delay elements that compensate for tuning dependent group delays caused by the weight settings of the add-drop filters.

In accordance with an embodiment of the present disclosure, there is provided a photonic device that comprises a first waveguide and a second waveguide. The first waveguide comprises an input port configured to receive an optical signal comprising M sub-signals that each has a respective wavelength. M is an integer greater than or equal to two. The photonic device also comprises M tunable add-drop filters (ADFs) coupled to the first waveguide and to the second waveguide. Each of the M tunable ADFs is configured to receive a respective tuning signal and each of the M tunable ADFs produces a respective ADF delay of the respective one of the M sub-signals in accordance with a value of the respective tuning signal. The photonic device also comprises M controllable optical delay elements (ODEs) coupled to the first waveguide, upstream from the M tunable ADFs. Each controllable ODE of the M controllable ODEs configured to receive a respective control signal and to impart a respective controllable ODE delay to the respective one of the M sub-signals in accordance with a value of the respective control signal. Each of the M sub-signals has associated thereto a respective combined delay equal to a sum of the respective ADF delay and the respective controllable ODE delay. Each control signal is configured to control each respective controllable ODE delay to produce a substantially same combined delay for each respective sub-signal of the M sub-signals.

In some embodiments, each of the M tunable ADFs comprises a respective tunable optical resonator coupled to the first waveguide, and a respective passive optical delay element coupled to the respective tunable optical resonator and to the second waveguide.

In some embodiments, each controllable ODE comprises a respective controllable all-pass filter.

In some embodiments, the respective tunable optical resonator is a microring resonator or a racetrack resonator.

In some embodiments, the respective passive optical delay is a microring delay element or a racetrack delay element configured to couple to the second waveguide with an efficiency greater than 95%.

In some embodiments, the respective passive optical delay element is a contra-directional coupler.

In some embodiments, the first waveguide has a first output port and the second waveguide has a second output port, and the photonic device further comprises a balanced photodetector coupled to both the first output port and to the second output port.

In some embodiments, the photonic device is a monolithic device.

In some embodiments, the M tunable ADFs are spaced apart along the first waveguide and along the second waveguide. Additionally, the first waveguide and the second waveguide are configured to provide a respective same optical path length between any pair of adjacent tunable ADFs of the M tunable ADFs.

In some embodiments, each ADF of the M tunable ADFs comprises a microring coupled to the first waveguide, and a passive delay ring coupled to the microring and to the second waveguide. Additionally, an optical path length between adjacent microrings is equal to an optical path length between adjacent respective passive delay rings plus a circumference of the passive delay ring configured to provide light to the other passive delay ring.

In some embodiments, the photonic device comprises a controller configured to provide the respective tuning signals to the M tunable ADFs and to provide the respective control signals to the M controllable ODEs.

In some embodiments, the photonic device is implemented on a silicon-on-insulator platform or on a silicon nitride platform.

In some embodiments, the photonic device is an optical dot product engine, and the M tunable ADFs define a weight bank of the ODPE.

In some embodiments, each tuning signal controls a splitting of an intensity of a respective one of the M sub-signals between the first output port and the second output port.

In accordance with an embodiment of the present disclosure, there is provided a photonic device that comprises a first waveguide and a second waveguide. The first waveguide has an input port configured to receive an optical signal comprising M sub-signals each having a respective wavelength. M is integer greater than or equal to two. The photonic device also comprises M tunable closed-loop optical resonators coupled to the first waveguide and configured to receive a respective tuning signal. The photonic device further comprises M passive closed-loop delay elements. Each of the M passive closed-loop delay elements is coupled to a respective one of the M tunable closed-loop optical resonators and to the second waveguide. Each of the M passive closed-loop delay elements and the second waveguide are configured to couple at least 95% of an optical signal propagating in any of the M passive closed-loop delay elements to the second waveguide.

In some embodiments, each of the M tunable closed-loop optical resonators includes a respective microring resonator, and each of the M passive closed-loop delay elements includes a respective passive delay ring.

In some embodiments, the first waveguide has a first output port positioned downstream from the M tunable closed-loop optical resonators. Additionally, the second waveguide has a second output port positioned downstream from the M passive closed-loop delay elements. Further, each tuning signal controls a splitting of an intensity of a respective one of the M sub-signals between the first output port and the second output port.

In accordance with an embodiment of the present disclosure, there is provided a method that comprises actions performed at a controller coupled to a plurality of tuned optical add-drop filters (ADFs) and to a corresponding plurality of controllable optical delay elements (ODEs). Each controllable ODE has associated thereto a respective one of the plurality of tuned optical ADFs thereby forming a plurality of ADF/ODE pairs. Each tuned optical ADF has associated thereto a respective ADF delay value. Each controllable ODE has associated thereto a respective controllable ODE delay and a respective minimum ODE delay. Each pair of the plurality of ADF/ODE pairs has associated thereto a combined delay equal to a sum of a respective ADF delay value and a respective controllable ODE delay. The actions comprise, for each ADF/ODE pair, calculating a respective sum of the respective ADF delay value and of the respective minimum ODE delay value, to obtain a plurality of sums; obtaining a value of largest sum of the plurality of sums; and controlling each controllable ODE to obtain a same combined delay for each of the plurality of ADF/ODE pairs, the same combined delay being equal to at least the value of the largest sum.

In some embodiments, the actions also comprise, at the controller, tuning each optical ADF of the plurality of optical ADFs, in accordance with pre-determined weights, to obtain the plurality of tuned optical ADFs.

In some embodiments, each one of the plurality of tunable optical ADFs includes a respective tunable optical resonator, and the actions include tuning each optical ADF includes tuning each tunable optical resonator.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present disclosure provides for a photonic device configured to perform matrix vector multiplications in accordance with weight settings defined by tunable add-drop filters. The photonic device may comprise controllable optical delay elements that compensate for tuning dependent group delays caused by the weight settings of the add-drop filters. By compensating for the tuning dependent group delays, the photonic device may perform matrix vector multiplications at higher frequencies.

The present disclosure provides a photonic device that has an input port through which an input optical signal comprising multiple wavelength components may be input. The photonic device also has a through port, a drop port and add-drop filters (ADFs) coupled to the through port and the drop port. Each ADF may be controlled individually to split each optical sub-signal between the through port and the drop port. In general, the splitting of the sub-signal between the through port and the drop port changes the delay between the sub-signals. The photonic device, for example, an optical dot product engine (ODPE) comprises a series of all pass filters (APFs) disposed upstream from the ADFs. Each APF can be controlled to pre-compensate for the delay difference produced by the ADFs.

Figure 1:
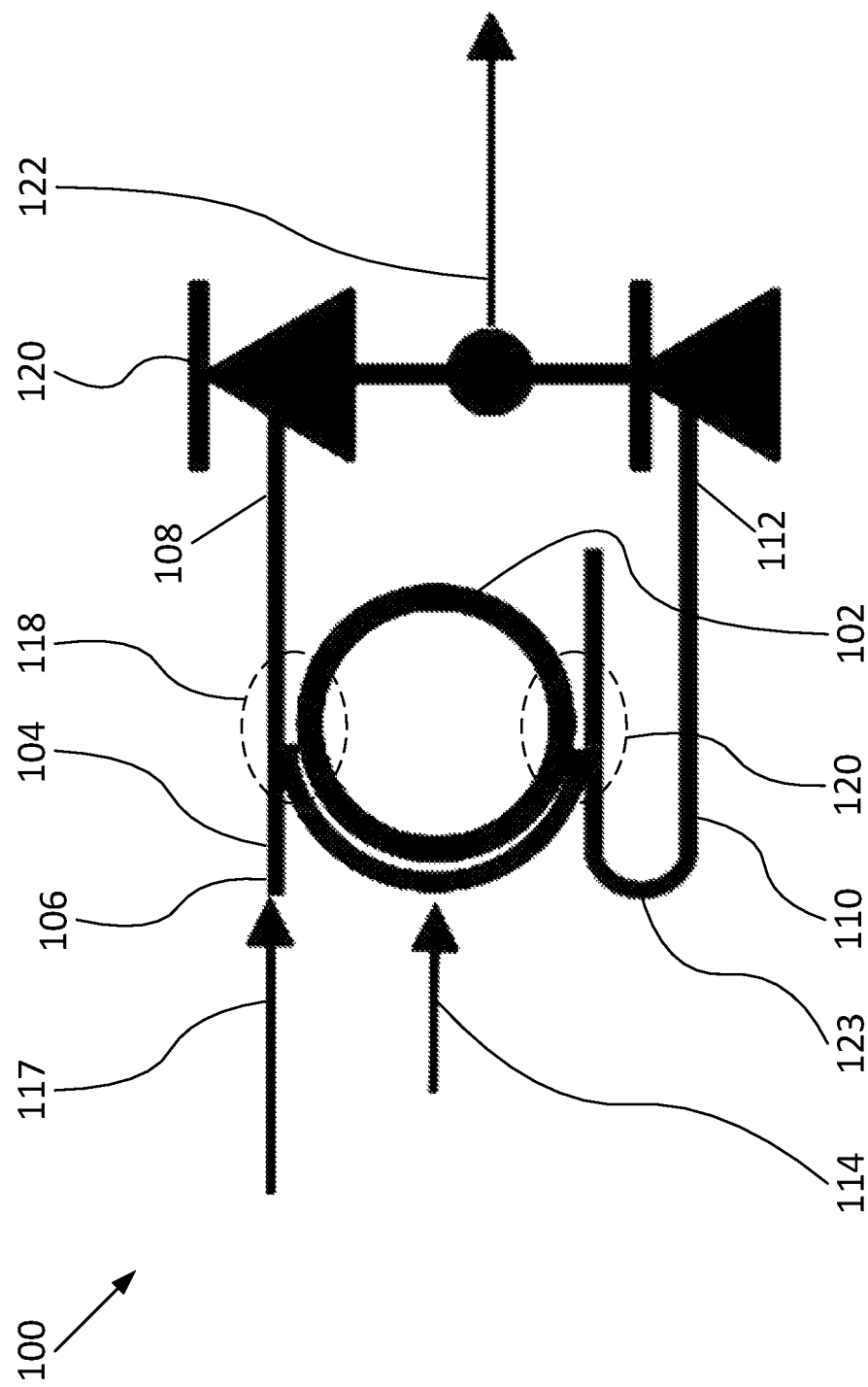
FIG. 1 shows a prior art optical dot product engine (ODPE) that has a single microring.

FIG. 1 shows a prior art ODPE 100 containing a single ADF in the form of a tunable microring resonator (MRR) 102. The ODPE 100 also includes a first waveguide 104 that as input port 106 and a through port 108. The ODPE 100 further has a second waveguide 110 that has a drop port 112. The MRR 102 is coupled to the first waveguide 102 and to the second waveguide 110. The MRR 102 is connected to a controller (not shown) that provides a tuning signal 114 to the MRR 102. The ODPE 100 also includes a balanced photodetector 116, which is coupled to the through port 108 and to the drop port 112. The OPDE 100 can also be referred to as a one-pole MRR weight element, where "one-pole" is in reference to the single MRR 102.

In operation, an optical input signal 117 enters the first waveguide 104 at the input port 106 and couples to the MRR 102 at the coupling region 118. Depending on the tuning signal 114 applied to the MRR 110, the optical input signal 117 is split, in ratio comprised between 0% and 100%, into a through port optical signal and a drop port optical signal, both of which are detected at the balanced photodetector 120, which outputs an electrical signal 122 that represent the difference in intensity between the through port optical signal and the drop port optical signal. The ODPE 100 effectively multiplies the intensity of the optical input signal by a value set by the control signal 114. The balance photodetector 120 determines the result of the multiplication. In the embodiment of FIG. 1, the input vector is a one component vector in the sense that the input optical signal includes only one sub-signal (at one wavelength). The single component of the vector is multiplied by the setting of the MRR 102, through the control signal 114.

For the outputs from the through port 108 and from the drop port 112 to reach the balanced photodetector 120, a half-loop 123 is needed in the second waveguide 110 to redirect the signal coupled to the second waveguide 110 to arrive at the balanced photodetector 120. However, the presence of the half-loop 123 introduces a time delay between the signal output at the through port 108 and the signal output at the drop port 112. The time-delay limits the OPDE 100 to low frequency applications.

Figure 2:
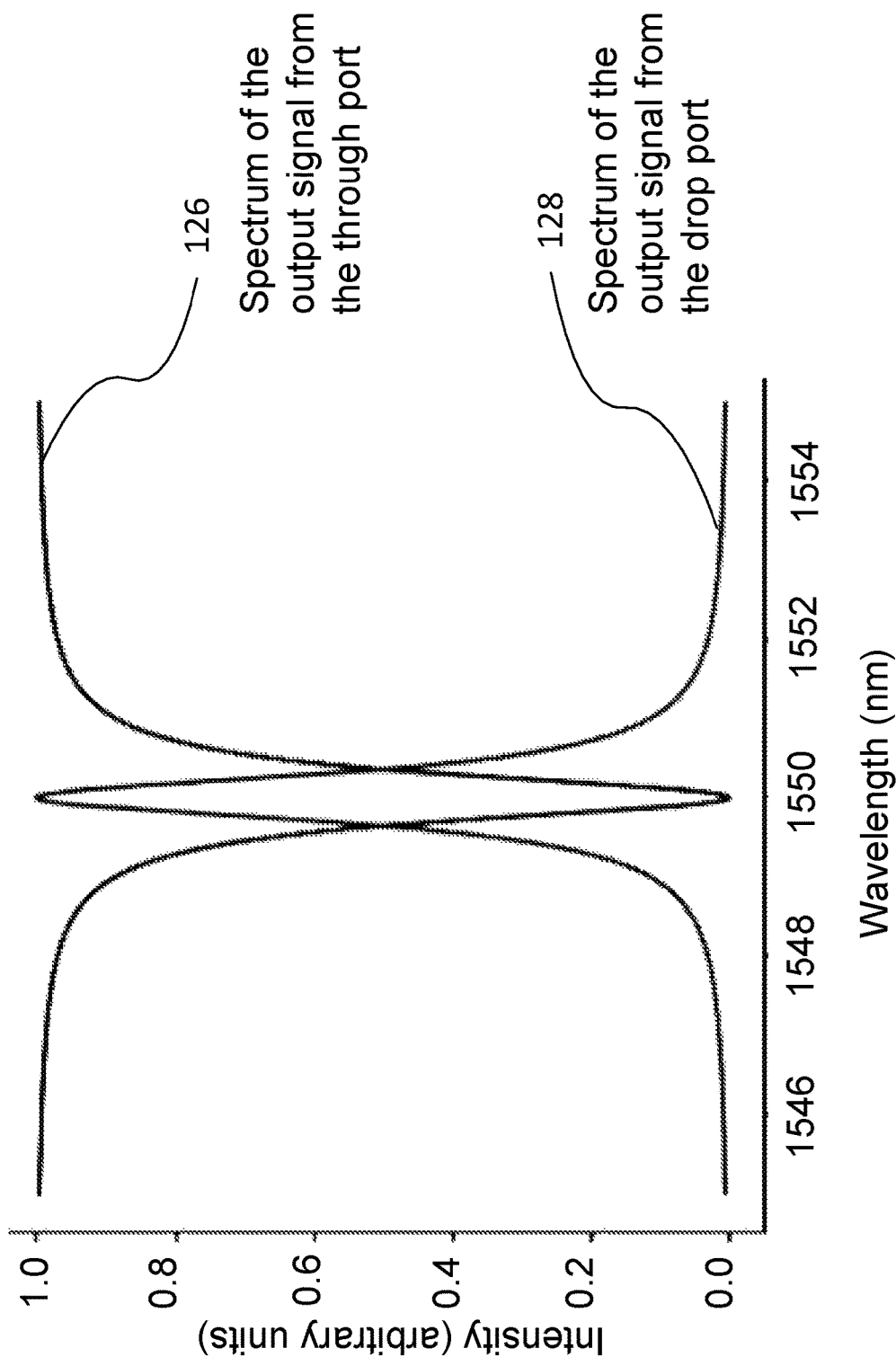
FIG. 2 shows a plot of normalized light intensity as a function of wavelength for light output from the through port and from the drop port for the ODPE of FIG. 1.

FIG. 2 shows a plot 126 of the normalized intensity of the light output from the through port 108 of the ODPE 100 of FIG. 1 as a function of wavelength of the input optical signal, when the MRR 102 is set to resonate at a wavelength of about 1550 nm. FIG. 2 also shows a plot 128 of the intensity of light output from the drop port 112 of the ODPE 100 of FIG. 1 as a function of the wavelength of the input optical signal, when the MRR 102 is set to resonate at a wavelength of about 1550 nm. As will be understood by the skilled worker, the plots 126 and 128 have complementary Lorentzian profiles.

Figure 3:
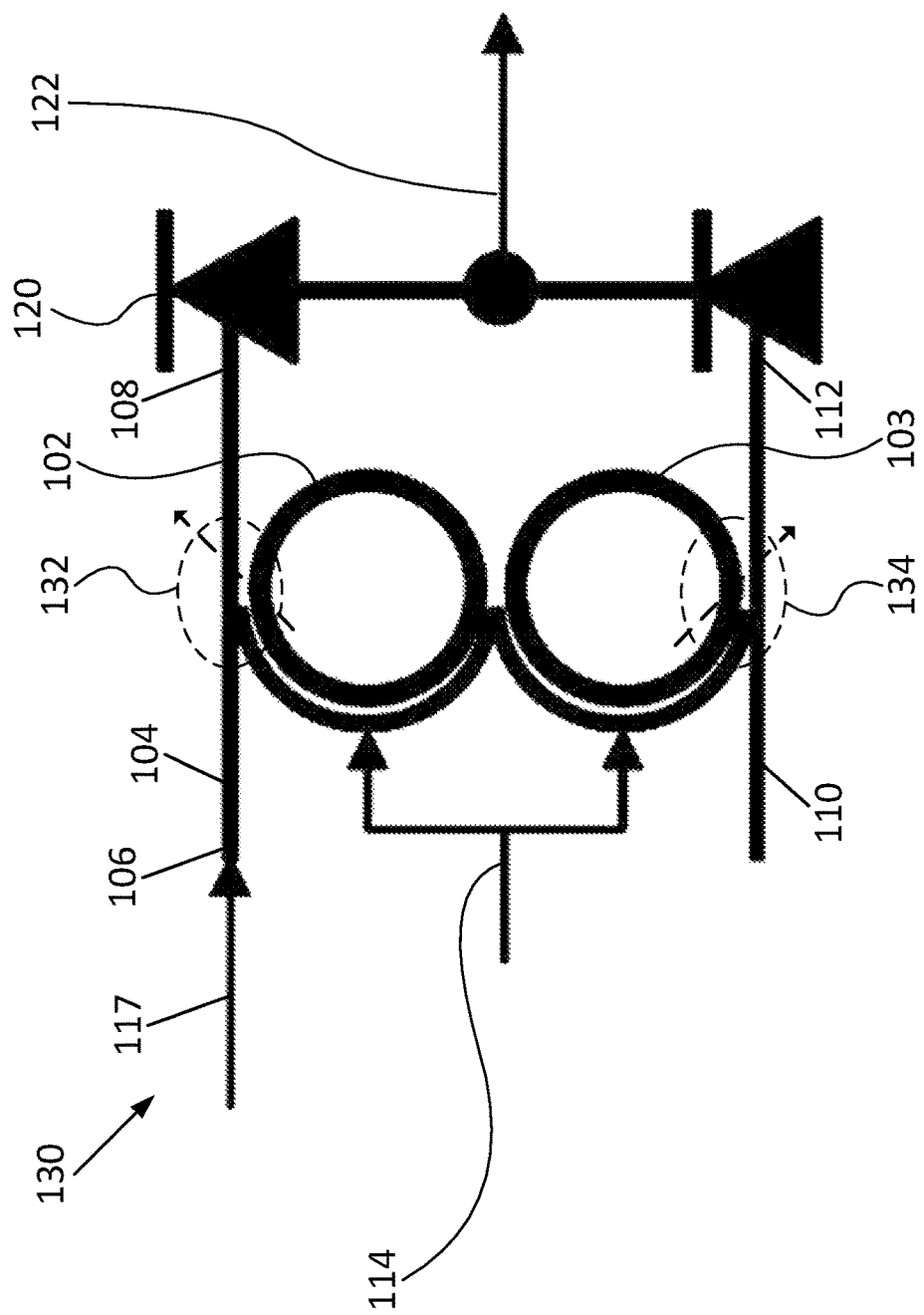
FIG. 3 shows a prior art ODPE that has two microrings.

FIG. 3 illustrates another prior art OPDE 130 containing a first MRR 102 and a second MRR 103. The ODPE 130 also includes a first waveguide 104 that as input port 106 and a through port 108. The ODPE 130 further has a second waveguide 110 that has a drop port 112. The first MRR 102 is coupled to the first waveguide 102 and to the second MRR 103, which in turn is coupled to the second waveguide 110. The MRRs 102 and 103 are connected to a controller (not shown) that provides a control signal 114 to both MRRs 102 and 103. The ODPE 130 also includes a balanced photodetector 120, which is coupled to the through port 108 and to the drop port 112.

Contrary to the ODPE 100 of FIG. 1, the ODPE 130 of FIG. 3 provides the same optical path length for the optical signal output from the through port 108 and for the optical signal output from the drop port 112. The delay caused in the ODPE 100 of FIG. 1 is thus absent from the ODPE 130 of FIG. 3. This can be an advantage with respect to operating on high frequency optical signals.

In operation, an optical input signal 117 enters the first waveguide 104 at the input port 106 and couples to the MRR 102 at the coupling region 132. Light circulating in the MRR 102 can couple to the second MRR 103 and from the MRR 103 to the second waveguide 110 at the coupling region 134. Depending on the control signal 114 applied to the MRRs 102 and 103, the optical input signal 117 is split into a through port optical signal and a drop port optical signal, both of which are detected at the balance photodetector 120, which outputs an electrical signal 122 that represent the difference in intensity between the through port optical signal and the drop port optical signal. The ODPE 130 effectively multiplies the intensity of the optical input signal by a value set by the control signal 114. The balance photodetector 120 determines the result of the multiplication. The OPDE 130 can also be referred to as a two-pole MRR weight element, where "two-pole" is in reference to the two MRRs, namely MRR 102 and MRR 103.

When the number of MRRs in an ADF is even, such as in two-pole configuration (e.g., see FIG. 3), a four-pole configuration, etc., no redirection of light is required because output signal from the last MRR exits in the same direction as the output signal at the through port, and their path length towards a balanced photodetector can be similar or equal. However, a two-pole MRR is more complex to tune than a one-pole configuration.

Figure 4:
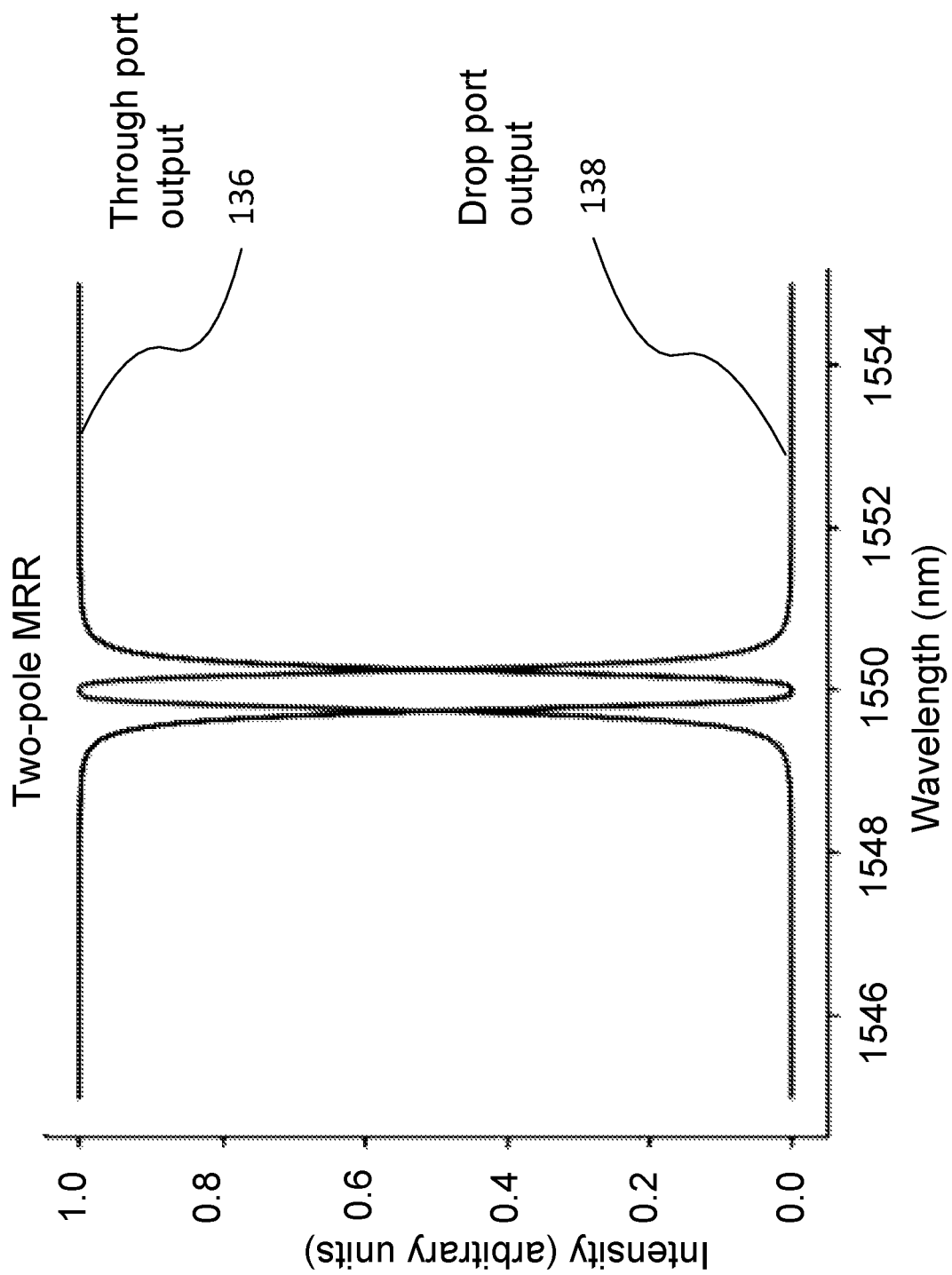
FIG. 4 shows a plot of normalized light intensity as a function of wavelength for light output from the through port and from the drop port for the OPDE of FIG. 3.

FIG. 4 shows a plot 136 of the intensity of the light output from the through port 108 of the ODPE 130 of FIG. 3 as a function of wavelength of the input optical signal, when the MRR 102 and the MRR 103 are set to resonate at a wavelength of about 1550 nm. FIG. 4 also shows a plot 138 of the intensity of light output from the drop port 112 of the ODPE 130 of FIG. 3 as a function of wavelength of the input optical signal, when the MRR 102 and the MRR 103 are set to resonate at a wavelength of about 1550 nm. Comparing the plots of FIGS. 2 and 4, it is apparent that the spectral width of the drop port signal is narrower for the ODPE 130 of FIG. 3 than for the OPDE 100 of FIG. 1. It is also clear that the through port output signal has a steeper roll-off for the ODPE 130 of FIG. 3 than for the OPDE 100 of FIG. 1. As such, even though the OPDE 130 of FIG. 3 does not have the time delay problem of the OPDE 100 of FIG. 1, it does have a narrower optical bandwidth, which can be limiting.

Figure 5:
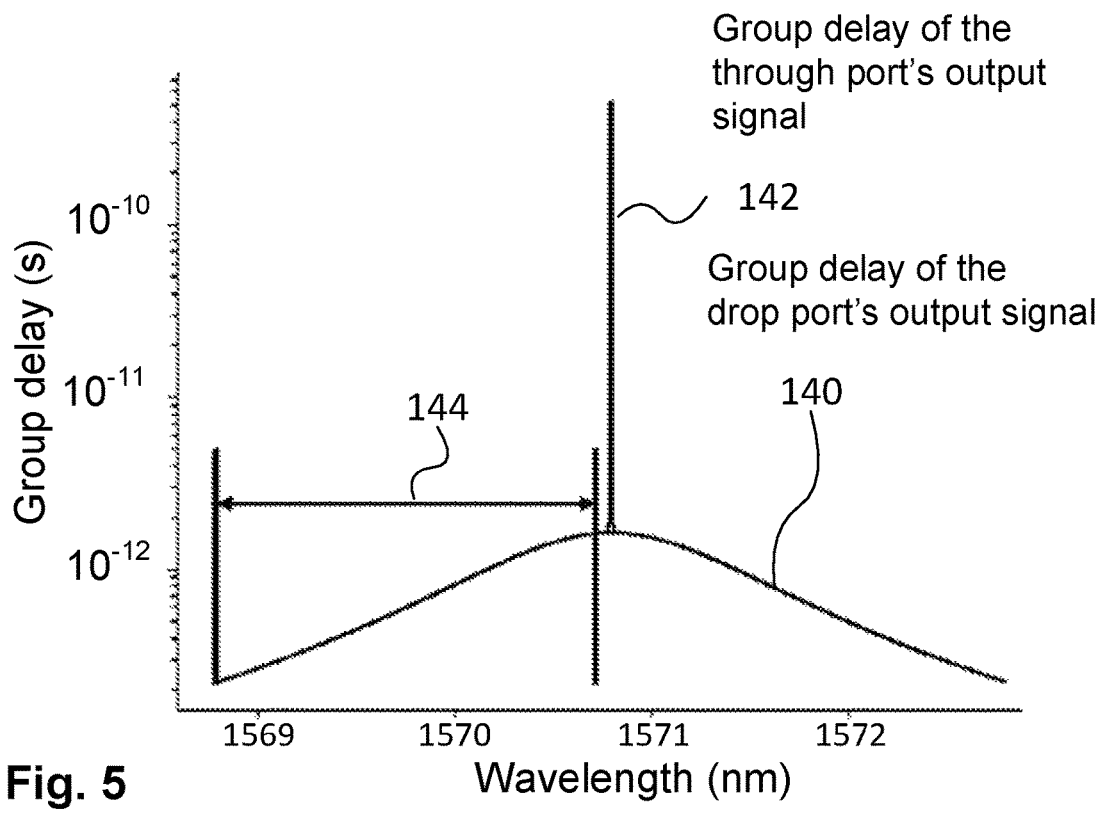
FIG. 5 shows a plot of the group delay as a function of wavelength for light the through port of the OPDE of FIG. 1, and a corresponding plot for the light output at the drop port of the same ODPE.

Referring back to the embodiment of FIG. 1, in addition to the time-delay issue caused by the half-loop 123, there is also an issue with the variation of the time-delay over the tuning range of the MRR 102. FIG. 5 shows an exemplary plot 140 of the group delay as a function of wavelength for the optical signal at the drop port 112 shown in FIG. 1. The group delay as a function of wavelength for the optical signal at the through port 103 is the same as that at the drop port 112, except for a narrow wavelength region at the resonant peak of the MRR 102. FIG. 5 also shows a plot 142 of the delay as a function of wavelength for the optical signal at the through port 103 shown in FIG. 1, and an example of a tuning range 144, which is on the lower wavelength side of the resonant peak. As will be understood by the skilled worker, in other embodiments, the tuning range may be on the higher wavelength side of the resonant peak. As shown in FIG. 5, the group delay at the through port has a sharp peak at the resonant wavelength.

Figure 6:
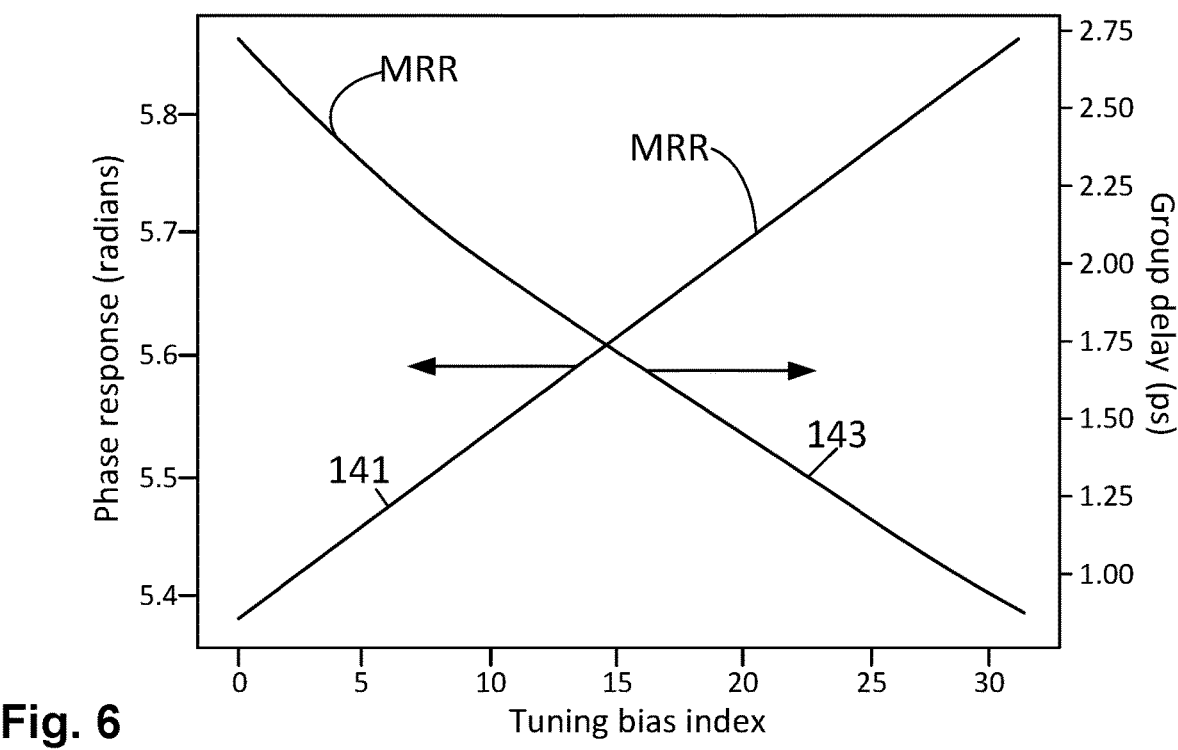
FIG. 6 shows a plot of the phase response of ODPE of FIG. 1 as a function of the tuning bias index and a plot of the group delay of the ODPE of FIG. 1 as a function of the tuning bias index.

FIG. 6 shows a plot 141 of the phase response of the MRR 102 of FIG. 1 as a function of the tuning bias index, which spans the tuning range 144 of the MRR 102. FIG. 6 also shows a plot 143 of the group delay of the MRR 102 of FIG. 1 as a function of the tuning bias index, which spans the same tuning range. As explained below, the tuning bias index is a representation of the voltage or current applied to a device (e.g., a MRR).

Figure 7:
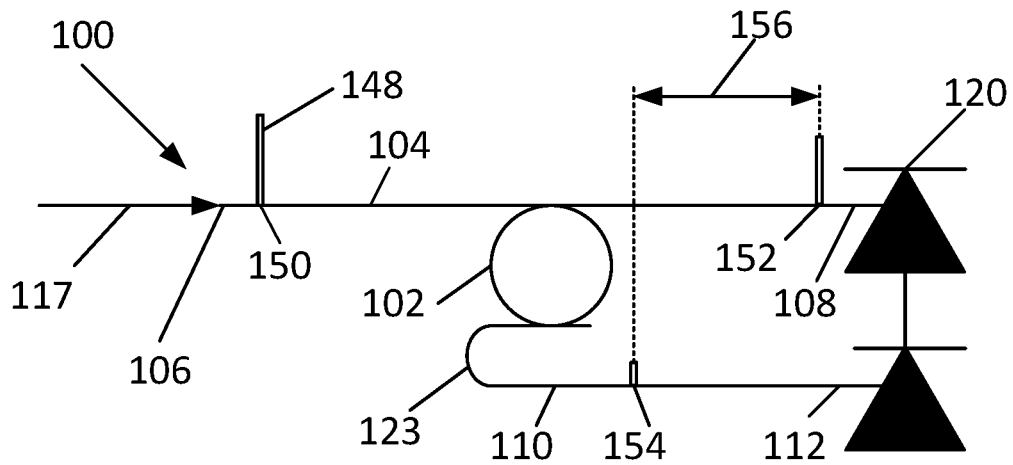
FIG. 7 shows the ODPE of FIG. 1 operating at a first tuning value.

FIG. 7 shows the ODPE 100 of FIG. 1, where the input optical signal 117 includes a single wavelength represented as a wave packet 148, which is depicted as a rectangular block. In the present example, when the MRR 102 is tuned to provide three quarters of the light intensity to the through port 108 and one quarter of the light intensity to the drop port. The delay between light at the through port and the light at the drop port is represented by the double arrow 156, which shows the difference between the position 152 and the position 154. The delay represented by the double arrow 156 takes into account the path difference caused by the presence of the half-loop 123 and the aforementioned wavelength dependent group delay.

Figure 8:
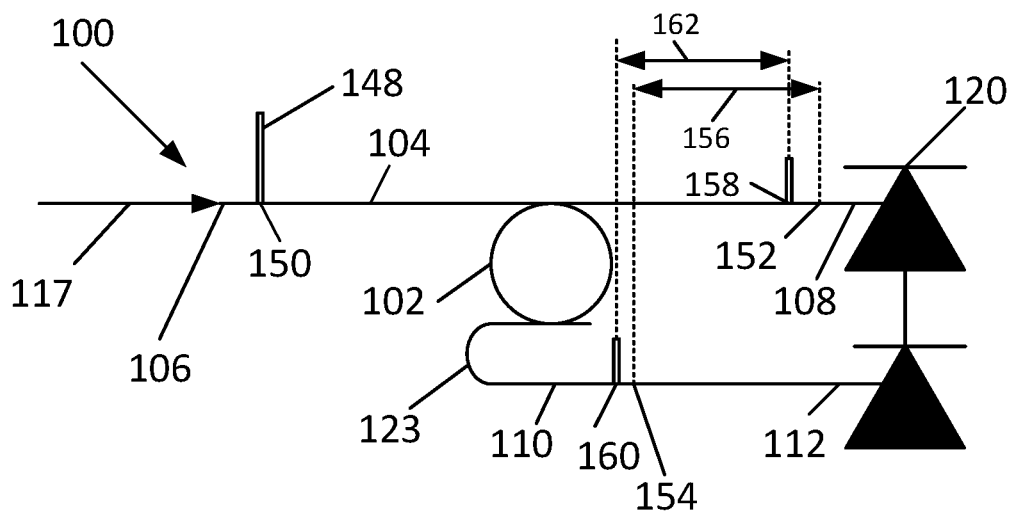
FIG. 8 shows the ODPE of FIG. 1 operating at a second tuning value.

FIG. 8 shows the same ODPE as in FIG. 8 but with the MRR 102 tuned to cause half of the wave packet 148 to reach the output port 108 and the other half of the wave packet 148 to reach to the drop port 112. During the same time interval as for the example of FIG. 6, half of the wave packet 148 will arrive at the position 158 and the other half of the wave packet 148 will arrive at the position 160. The difference in position between the position 158 and 160 is shown at 162, and is smaller than the delay shown at 156, on account of the wavelength dependent delay of the MRR 102. In ODPEs where the input optical signal includes multiple sub-signals at respective multiple wavelengths, the wavelength dependent component of the group delay will generally vary between wavelengths.

Figure 9:
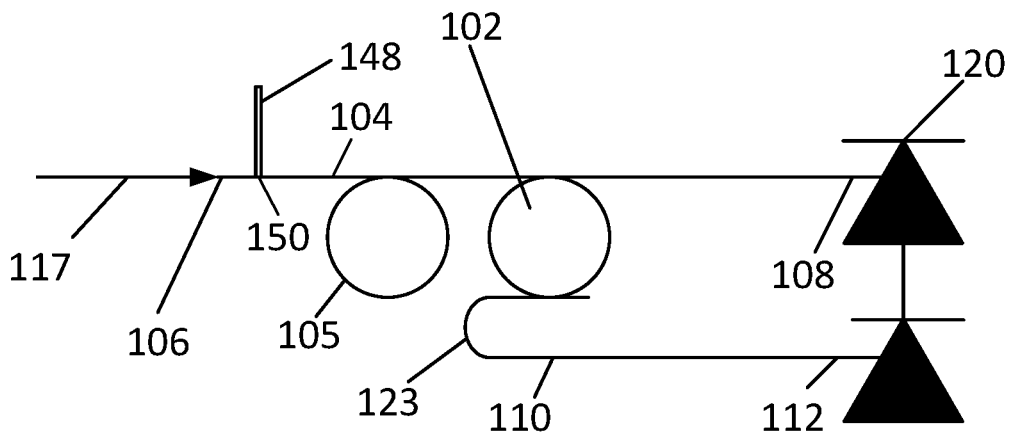
FIG. 9 shows an ODPE in accordance with an embodiment of the present disclosure.

Referring now to FIG. 9, the wavelength dependent component of the group delay can be controlled to be substantially the same for the wavelengths comprised within the MRR 102 profile by coupling an all-pass filter (APF) 105 to the input port 104 and controlling the APF 105. In accordance with embodiments of the present disclosure, by calibrating the APF 105 against the MRR 102, it is possible to achieve a constant phase difference (or a constant phase sum) between the phase shift induced by the APF 105 and the phase shift induced by the MRR 102, as a function of tuning bias. It is also possible to achieve a constant group delay difference (or a constant group delay sum) between the group delay caused by the APF 105 and the group delay caused by the MRR 102, as a function of tuning bias.

In some embodiments, the APF 105-MRR 102 may be calibrated by first tuning the APF 105 off resonance and calibrating the MRR 102 to find a set of tuning signals, i.e., voltages or currents applied to the MRR 102 that quantizes (for example, uniformly quantizes) the desired range of weight amplitude (e.g., a range [−1,+1]). The phase of the output signal is measured for each weight value, which provides a close estimate of the phase response of the MRR 102 since the APF 105 may have a negligible group delay when tuned off resonance. The APF 105 is then calibrated to find a set of voltages or current that adjust the phase shift induced by the APF 105 so that the overall phase response of the cascaded APF 105-MRR 102 pair is constant for all weight settings.

As an example, for a range of weight amplitudes comprised between −1 and +1 and for a step size of A between weight values, the calibration procedure would require determining 2/Δ values of the voltage or current that produce the desired weights. The voltage or current values may not be linear due to, for example, the design of the ring and the controller (tuner) and variations in the fabrication process. For that reason, it may be practical to display or plot metrics of the MRRs or APFs as a function of a tuning bias index instead of voltage or current. In the example of FIG. 6, the voltages (currents) that produce uniform step sizes for weights comprised between −1 and +1 are mapped onto a 5-bit tuning bias index that ranges from 0 to 31. The step size in the tuning bias index correspond to a change of $2/2^5=1/16=0.0625$ of the weight value.

The voltage or current values obtained to during the calibration of the APF may be mapped onto the same tuning bias index. In the example described above, we would have 32 tuning bias indexes that are mapped to a 2-tuple corresponding to the control signals for the APF and ADF that produces the target end-to-end delay.

Figure 10:
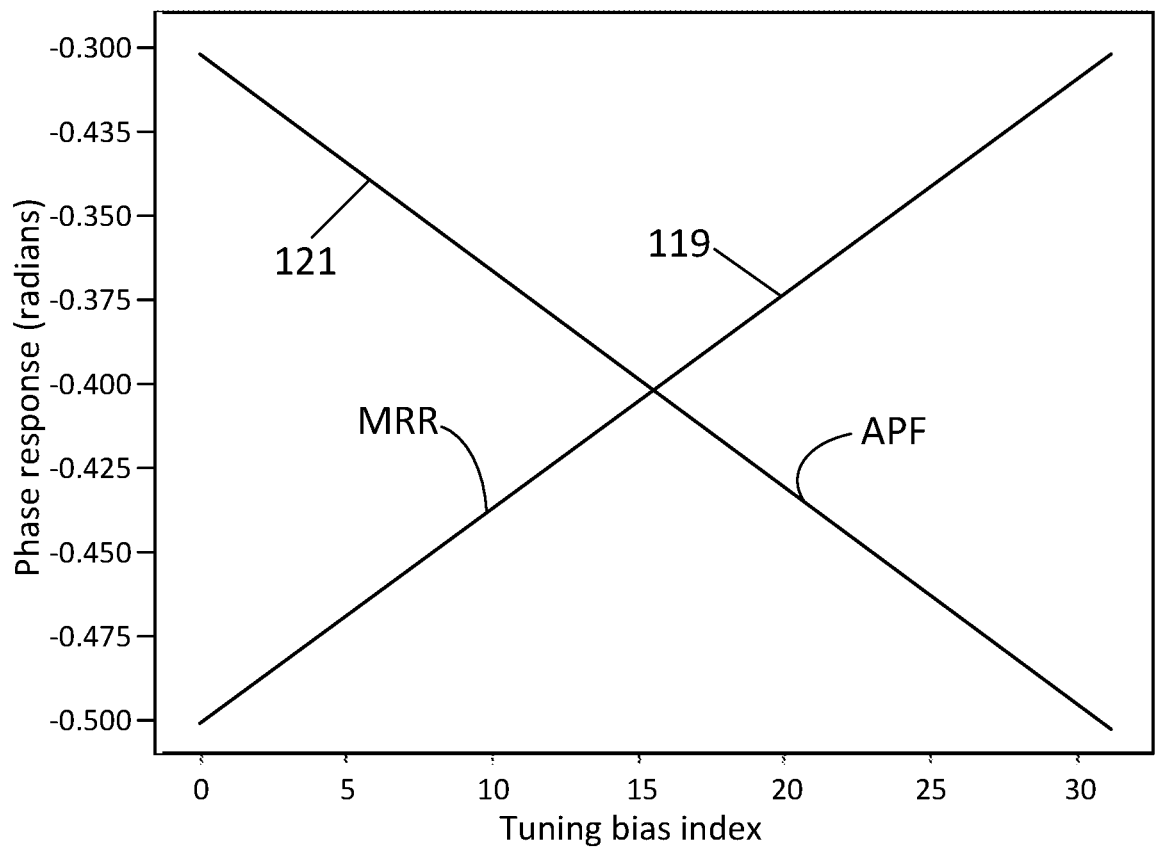
FIG. 10 shows a plot of the phase response of the microring as a function of tuning bias index for the ODPE of FIG. 9 102, and the plot of the phase response of the all-pass filter (APF) of FIG. 9.

FIG. 10 shows a plot 119 of the phase response of the MMR 102 as a function of the tuning bias for the MRR 102 and a plot 121 of the phase response of the APF 105. The phase response of the MRR 102 and of the ADF 105 are obtained after uniform quantization of the weight amplitude. The x-axis represents an offset in a calibration table with 5-bit weight quantization. As shown in FIG. 10, it is possible to maintain a substantially constant phase response difference between the phase response of the MRR 102 and the phase response of the APF 105 or a substantially constant sum of the phase response of the MRR 102 and the phase response of the APF 105. For the scenario shown in FIG. 10, the difference between the phase response of the MRR 102 (plot 119) and the phase response of the APF 105 (plot 121) is, for all the tuning bias index values, about −0.405 radian, i.e., the value at which plot 119 and plot 121 intersect. As the tuning bias index tunes the MRR 102 and the APF 105, the difference between the phase response of the MRR 102 and the phase response of the APF 105 can be maintained substantially constant for the tuning bias index range.

Figure 11:
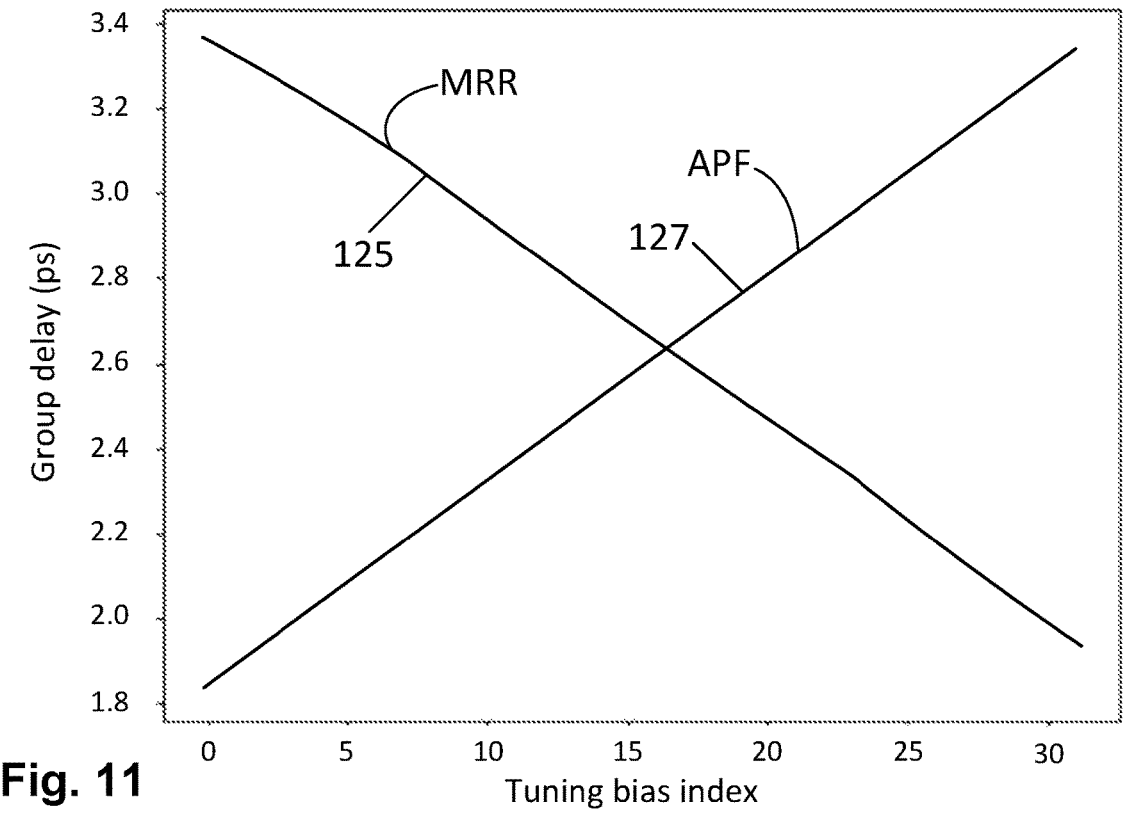
FIG. 11 shows a plot of the group delay of the MRR and of the APF, as a function of wavelength, in relation to the ODPE of FIG. 9.

FIG. 11 shows a plot 125 of the group delay of the MMR 102 as a function of the tuning bias and a plot 127 of the group delay the APF 105 as a function of the tuning bias, for the same conditions as those related to FIG. 10. As shown in FIG. 11, and as will be understood by the skilled worker, it is possible to maintain a substantially constant group delay difference (or sum) between the group delay of the MRR 102 and the group delay of the APF 105. For the scenario shown in FIG. 11, the difference between the group delay of the MRR 102 (plot 125) and the group delay of the APF 105 (plot 127) is, for all the tuning bias index values, about 2.65 ps, i.e., the value at which plot 125 and plot 127 intersect. As the tuning bias index tunes the MRR 102 and of the APF 105, the difference between the group delay of the MRR 102 and the group delay of the APF 105 can be maintained substantially constant for the wavelength range corresponding to the tuning index range.

Figure 12:
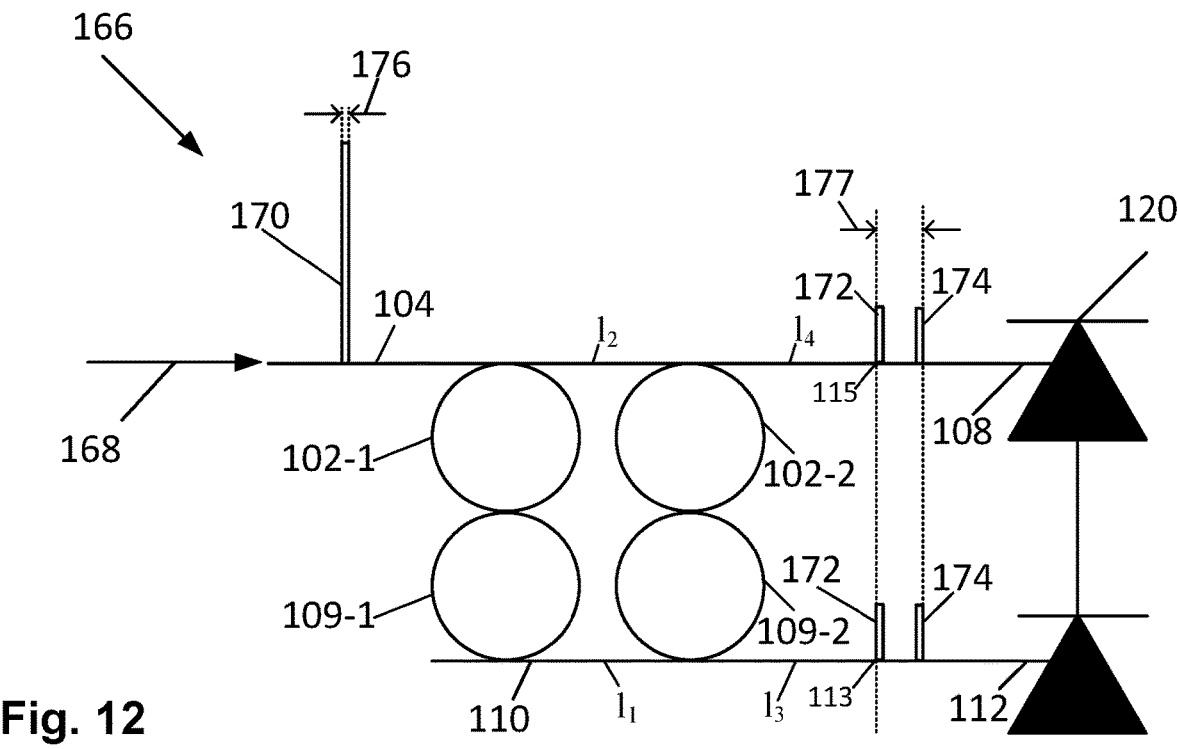
FIG. 12 shows an ODPE in accordance with another embodiment of the present disclosure.

In accordance with the present disclosure, FIG. 12 shows an example of photonic device, for example an ODPE 166, having two ADFs, each comprising a MRR and a passive delay ring (PDR). The two MRRs are MRR 102-1 and MRR 102-2, and two PDRs are PDR 109-1 and 109-2. In the present example, MRR 102-1 and PDR 109-1 have the same radius $r_1$, and MRR 102-2 and PDR 109-2 have the same radius $r_2$, which is different than $r_1$. The PDR 109-1 and the PDR 109-2 are broadband PDRs that will couple light at any of the wavelengths at which the OPDE 166 operates. The coupling efficiency of each PDR may range from 95% to 100%. In some embodiments, the PDRs may be wavelength specific as long as each PDR has sufficient bandwidth to provide a flat response over the frequency range of the input optical (sub-) signal provided thereto.

In the present example, the optical path length between PDR 109-1 and PDR 109-2 is labelled $l_1$ and the optical path length between MRR 102-1 and MRR 102-1 is labelled $l_2$. Further, the optical path length between PDR 109-2 and the position 113 is labelled $l_3$, and the optical path length between the MRR 102-1 and the position 115 is labelled $l_4$.

In the present example, the ODPE 166 is configured such that: $l_2=l_1+2\pi r_1$, which compensates for the delay difference caused by PDR 109-1, and $l_4=l_3+2\pi r_2$, which compensates for the delay difference caused by PDR 109-2. As will be understood by the skilled worker, the path length differences between $l_2$ and $l_1$, and $l_4$ and $l_3$ ($2\pi r_1$ and $2\pi r_2$ respectively) may be compensated using simple delay lines formed in the first waveguide 104 (e.g., loops or spiral patterns in the waveguide paths).

Because the PDR 109-2 operates on a broadband of wavelengths, any light propagating in the second waveguide 110, downstream from the PDR 109-1 and toward the PDR 109-2, will couple into the PDR 109-2. Therefore, when $l_2=l_1+2\pi r_1$, and $l_4=l_3+2\pi r_2$, and because light propagating in the second waveguide 110, downstream from the PDR 109-1 and toward the PDR 109-2, couples into the PDR 109-2, the optical path length for light arriving at the balanced photodetector 120 from the first waveguide 104 will be nominally the same as the optical path length for light arriving at the balanced photodetector 120 from the second waveguide 104.

In the present example, an input optical signal 168 comprising two sub-signals at two distinct wavelengths ($\lambda_1$ and $\lambda_2$) is input into the first waveguide 104. The input optical signal 168 may be represented by a wave packet shown as block 170. In this example, the first ADF (which comprises MRR 102-1 and APF 109-1) is tuned by tuning the MRR 102-1 to provide half of the sub-signal at the first wavelength at the through port 108 and the other half at the drop port 112. The halves of the sub-signal at first wavelength are shown at 172. The second ADF (which comprises the MRR 102-2 and the APF 109-2) is tuned by tuning the second MRR 102-2 to provide half of the sub-signal at the second wavelength at the through port 108 and the other half at the drop port 112. The halves of the sub-signal at second wavelength are shown at 174. Because the MRR 102-1 and the MRR 102-2 will generally not have the same wavelength dependent delay, the input wave packet is spread out in time from a width of 176 to a wider width of 177. The spread between the sub-signals 172 and 174 prevents coherent summing of the sub-signals at the balanced photodetector 120, which limits the bandwidth and the accuracy of the dot product measured by the ODPE 166. In this example, the MRR 102-1 adds more delay to the sub-signal at the first wavelength than the MRR 102-2 adds to the sub-signal at the second wavelength. As will be understood by the skilled worker, the more wavelength components there are in the input optical signal, the greater the increase in width of the through port wave packet and the drop port wave packet is likely to be, which may negatively impact operation of ODPEs at high frequencies.

In the ODPE 166 of FIG. 12, the input optical signal can be considered as an input vector with two components, where the first vector component is the intensity of the sub-signal at the first wavelength and the second vector component is the intensity of the sub-signal at the second wavelength, distinct from the first wavelength. One of the two components of the vector is multiplied in accordance with the tuning of the MRR 102-1, the other of the two components of the vector is multiplied in accordance with the tuning of the MRR 102-2. The balanced photodetector 120 measures the difference between: (a) the sum of the intensity of the signal at the first wavelength and of the intensity of the signal at the second wavelength at the through port 108 and (b) the sum of the intensity of the signal at the first wavelength and of the intensity of the signal at the second wavelength at the drop port 112. The combination of the first MRR 102-1 and of the second MRR 102-1 coupled to the first waveguide 104 and to the second waveguide 110 (through APF 109-1 and APD 109-2) can be referred to as a weight bank or as a photonic weight bank.

Figure 13:
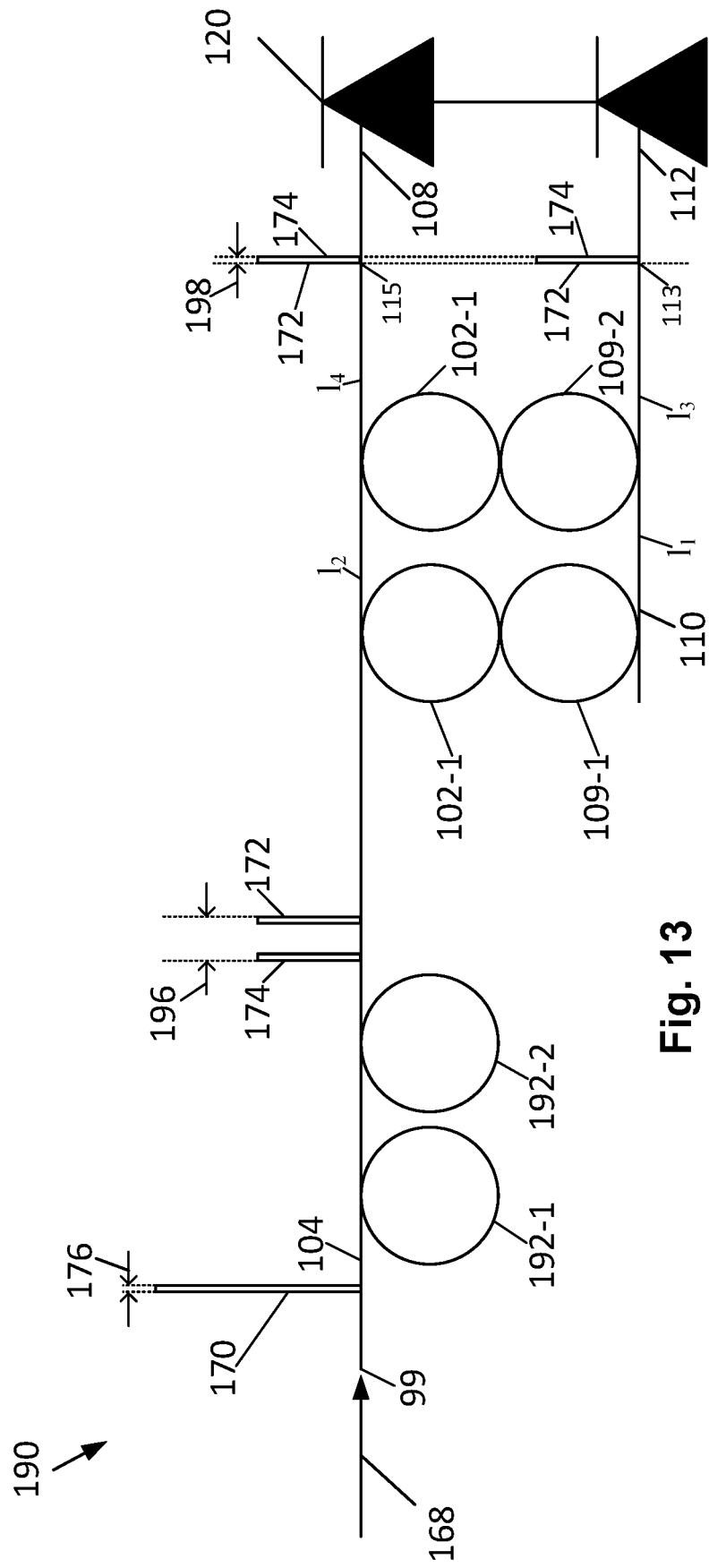
FIG. 13 shows an ODPE in accordance with yet another embodiment of the present disclosure.

In some embodiments according to the present disclosure, the optical input signal can be modified prior to the optical input signal reaching the MRRs to minimize the widening of the input wave packet. FIG. 13 shows a non-limiting embodiment of the present disclosure that does this. In accordance with the present disclosure, FIG. 13 shows an embodiment of an ODPE 190 where an input optical signal 168 comprises two sub-signals at two distinct wavelengths is input into the first waveguide 104. That is, the first waveguide 104 has an input port 99 configured to receive the optical signal 168. As will be understood by the skilled worker, the input optical signal 168 can comprise more than two sub-signals. Generally, the input optical signal 168 may comprise M sub-signals, where M is an integer greater than or equal to two. The input optical signal, propagating in the first waveguide 104 is represented by the wave packet shown at block 170. In addition to the elements of ODPE 166 of FIG. 12, the ODPE 190 of FIG. 13 also comprises a first tunable all-pass filter (APF) 192-1 and a second APF 192-1, both of which are upstream from the MRRs. The APFs 192-1 and 192-2 are tunable in the sense that they can vary the phase of signals at their design wavelength and consequently delay a signal at their design wavelength with respect to signals at other wavelengths. The APFs are an example of controllable optical delay elements that may be used in embodiments of the present disclosure.

In the example of FIG. 13, the APF 192-1 is configured to delay the sub-signal at the first wavelength and the APF 192-2 is configured to delay, independently from the APF 192-1, the delay of the sub-signal at the second wavelength. By independently controlling the APF 192-1 and the APF 194-2, it is possible to space apart, in time, the sub-signal at the first wavelength 172 from the sub-signal at the second wavelength 174 prior to the sub-signals reaching MRR 102-1 and MRR 102-2. In the example of FIG. 13, the APF 192-1 and the APF 192-2 are set to delay the sub-signal at the second wavelength 174 relative to the sub-signal at the first wavelength 172, by a time spacing shown at 196, which, through calibration of the APF 192-1, the MRR 102-1, the APF 192-2 and the MRR 102-2, can balance the delay caused by the wavelength dependency of the MRR 102-1 and the MRR 102-2. That is, referring back to FIG. 12, when the MRR 102-1 and the MRR 102-2 cause the sub-signal at the first wavelength 172 to be delayed relative to the sub-signal at the second wavelength 174 by the delay shown at 177, the APF 192-1 and the APF 192-2 can be set to cause the sub-signal at the second wavelength 174 to be delayed relative to the sub-signal at the first wavelength 172 by the same delay, prior to the sub-signal at the first wavelength 172 and the sub-signal at the second wavelength 172 arriving at the MRR 102-1 and the MRR 102-2. Accordingly, as shown in FIG. 13, the width 198 of optical signals at the through port 108 and at the drop port 112 can be controlled to have substantially the same width 176 as that of the input wave packet (block 170). In FIG. 13, as in FIG. 12, $l_2=l_1+2\pi r_1$, which compensates for the delay difference caused by PDR 109-1, and $l_4=l_3+2\pi r_2$, which compensates for the delay difference caused by PDR 109-2. The through port 108 may also be referred to as the output port of the first waveguide 104. The drop port 108 may also be referred to as the output port of the second waveguide 104. The MRR 102-1 and the PDR 109-1 constitute an example of a tunable add-drop filter coupled to the first waveguide 104 and to the second waveguide 110. The MRR 102-2 and the PDR 109-2 also constitute a tunable add-drop filter. In embodiments of the present disclosure, there may be as many tunable add-drop filters as there are sub-signals in the input optical signal.

Figure 14:
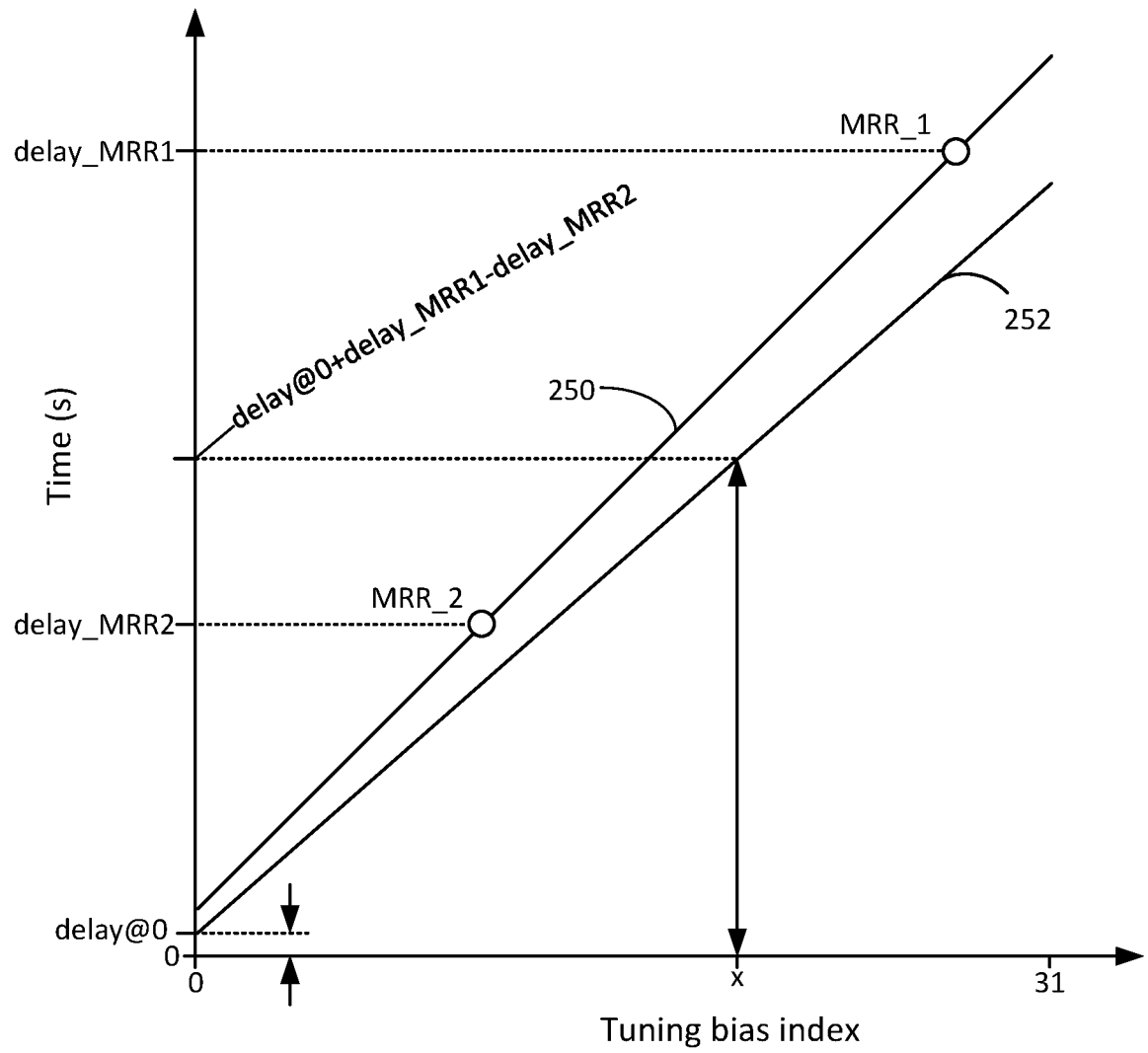
FIG. 14 shows plots of group delay as a function of tuning bias index for the MRRs and for the APFs of the embodiment of FIG. 13.

FIG. 14 shows an example of a plot 250 of the group delay of the MRR 102-1 as a function of the tuning bias index. The group delay of the MRR 102-2 as a function of the tuning bias index has the same plot as plot 250. FIG. 14 also shows a plot 252 of the group delay of the APF 192-1 as a function of the tuning bias index. The group delay of the APF 192-2 as a function of the tuning bias has the same plot as plot 252. In the example of FIG. 14, the MRR 102-1 has a tuning value that produces a delay equal to delay_MRR1, and the MRR 102-1 has a tuning value that produces a delay equal to delay_MRR2. At the tuning bias index equal to zero, APF 192-1 and APF 192-2 have a non-zero group delay equal to delay@0.

Thus, because of the non-zero APF delay at the tuning bias index zero (delay@0), the minimum total delay caused by the MRR 102-1 and APF_109-1 is equal to delay_MRR1+delay@0 when the tuning bias index of the APF 109-1 is set to zero but will be greater than delay_MRR1+delay@0 for all other tuning bias index values of the APF 109-1. Consequently, when the tuning index bias value of APF 109-1 is set to zero, and when wanting to have the same total delay for the sub-signal at the first wavelength and the sub-signal at the second wavelength, the tuning bias index of 109-2 must be set to a value that produces:

delay_APF2=delay@0+delay_MRR1−delay_MRR2.

Generally, when multiple APFs and ADFs (MRRs+PDRs) are present in an ODPE, it is possible to determine the total delay value needed for all the pairs of APF/ADF by identifying, for each pair of APF/MRR:

a) The delay for each MRR at its weight setting (the controller of the MRRs may have access to a table containing values of, for each MRR, the MRR delay for each weight setting of the MRR)
b) The minimum delay of the APF associated with the MRR (the controller of the APFs may have access to a table containing values of, for each APF, the APF delay for each weight setting of the tuning bias index value of the APF)
c) The sum of a) and b)

The total delay value needed for all the pairs of APF/MRR (or all the pairs of APF/ADF) is obtained by identify the largest of all the sums of a) and b).

Figure 15:
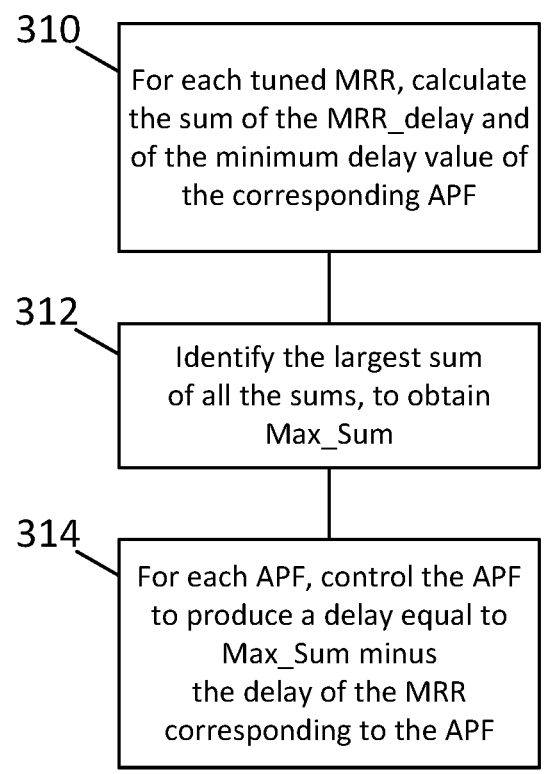
FIG. 15 shows a flowchart of a method in accordance with a further embodiment of the present disclosure.

FIG. 15 shows a flowchart of an embodiment of a method of identifying the total delay value, in accordance with the present disclosure. The method may begin after each MRR of each ADF (MRR) has been tuned in accordance with pre-determined weight settings. Each MRR has been previously calibrated and, for each MRR the delay value of the MRR for each weight value (for each tuning index bias value) is known. Also know is the delay value of the associated APF for each value of the tuning index bias of the APF. The lowest APF delay value amongst all the tuning index bias values of the APF is known as well or can be obtained.

At action 310, for each ADF (MRR) of the ODPE and for each corresponding APF, the sum of the MRR delay at its weight setting and of the lowest APF delay for the corresponding APF, is obtained. At action 312, the largest of all the sum values (Max_Sum) may be obtained. At 314, each APF may be controlled to obtain an APF delay equal to Max_Sum minus the delay of the MRR corresponding to the APF. Further, it may be possible to control the APFs to obtain a same total delay value that is larger than Max_Sum.

Figure 16:
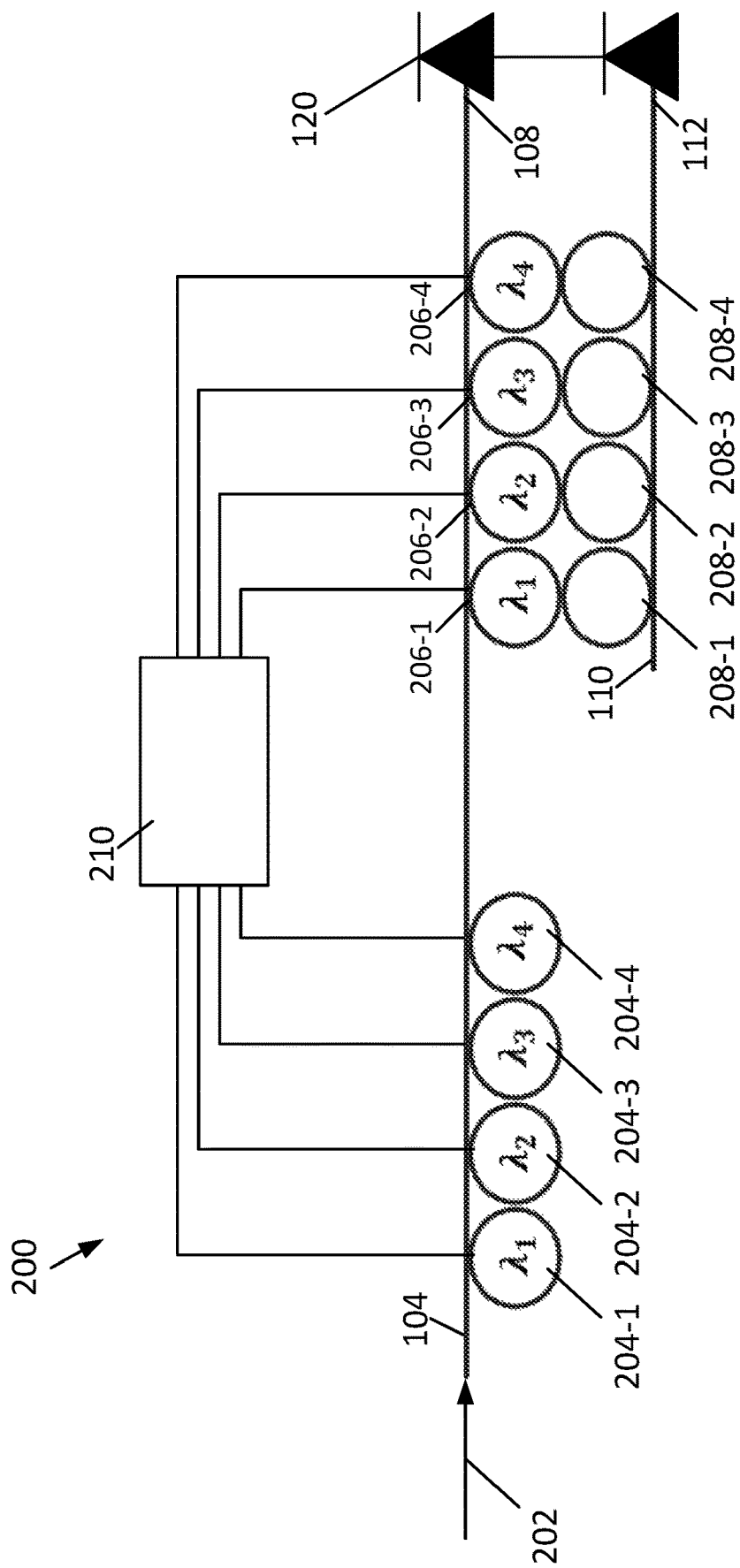
FIG. 16 shows another embodiment of an ODPE in accordance with the present disclosure.

FIG. 16 shows a non-limiting embodiment of an ODPE 200 according to the present disclosure. The ODPE 200 is configured to operate on an input optical signal 202 that may comprise four optical sub-signals at wavelengths $\lambda_1, \lambda_2, \lambda_3$ and $\lambda_4$, and has an input waveguide 104, an output waveguide 110 and may have a balanced photodetector 120. The ODPE 200 may also have four APFs 204-1, 204-2, 204-3 and 204-4 configured to operate on the sub-signals having the respective wavelengths $\lambda_1, \lambda_2, \lambda_3$ and $\lambda_4$.

The APFs are an example of a controllable optical delay elements that may be used in embodiments of the present disclosure. The ODPE 200 may further have four MRRs 206-1, 206-2, 206-3 and 206-4 configured to operate on the sub-signals having the respective wavelengths $\lambda_1, \lambda_2, \lambda_3$ and $\lambda_4$, and four PDRs 208-1, 208-2, 208-3 and 208-4. Furthermore, the ODPE 200 may have a controller 210 coupled to the APFs 204-1, 204-2, 204-3 and 204-4 and to the MRRs 206-1, 206-2, 206-3 and 206-4. Each pair of MRR 206-j and PDR 208-j (j=1 to 4) may be referred to as an ADF (ADF-j). Each ADF is a tunable ADF that may be tuned in accordance with a respective tuning signal provided by the controller 210. There may be as many tunable ADFs as there are sub-signals in the input optical signal. There may be as many controllable delay elements as there are sub-signals in the input optical signal. The tunable ADFs are spaced apart along the first waveguide 104 and along the second waveguide 110. The tunable ADFs are downstream from the APFs. The first waveguide and the second waveguide are configured to provide a respective same optical path length between any pair of adjacent tunable ADFs of the tunable ADFs.

The controller 210 may be configured to tune (control) the MRR 206-1 to split the $\lambda_1$-component of the input optical signal 202, in any suitable proportion, between the through port 108 and the drop port 112. That is, the controller 210 may tune (control) the MRR 206-1 to provide between 0% and 100% of the $\lambda_1$-component to the through port 108 and, correspondingly, between 100% and 0% of the $\lambda_1$-component to the drop port 112. The tuning of the MRR 206-1 may vary the delay caused by the MRR 206-1. The controller 210 may also be configured to control the APF 204-1 to produce an additional delay of the $\lambda_1$-component for each tuning or weight setting of the MRR 206-1. The additional delay provided by APF 204-1 for a particular value of the tuning setting of MRR 206-1 may be determined in concert with the delays caused by MRR 206-1, MRR 206-2, MRR 206-3 and MRR 206-4 and the additional delays caused by APF 204-2, APF 204-3 and APF 204-4.

Similarly, the controller 210 may be configured to tune (control) the MRR 206-$j$ ($j$=2 to 4) to split the $\lambda_j$-component of the input optical signal 202, in any suitable proportion, between the through port 108 and the drop port 112. For example, the controller 210 may tune (control) the MRR 206-$j$ to provide between 0% and 100% of the $\lambda_j$-component to the through port 108 and, correspondingly, between 100% and 0% of the $\lambda_j$-component to the drop port 112. The tuning of the MRR 206-$j$ may vary the delay caused by the MRR 206-$j$. The controller 210 may also be configured to control the APF 204-$j$ to produce an additional delay of the $\lambda_j$-component for each tuning or weight setting of the MRR 206-1 in concert with the delays caused by the other MRRs and the additional delays caused by the other ADFs. For each pair of APF/MRR to have the same total delay, the method shown in the embodiment of FIG. 15 may be applied.

In some embodiments, all the MRRs may have substantially the same group delay as a function of the MRR tuning bias index profile and all the APFs may have substantially the same group delay as a function of an APF tuning bias index profile. In such embodiments, each APF may be controlled to have an APF delay equal the largest of all the MRR delays for the current weight settings, plus the minimum APF delay.

Figure 17:
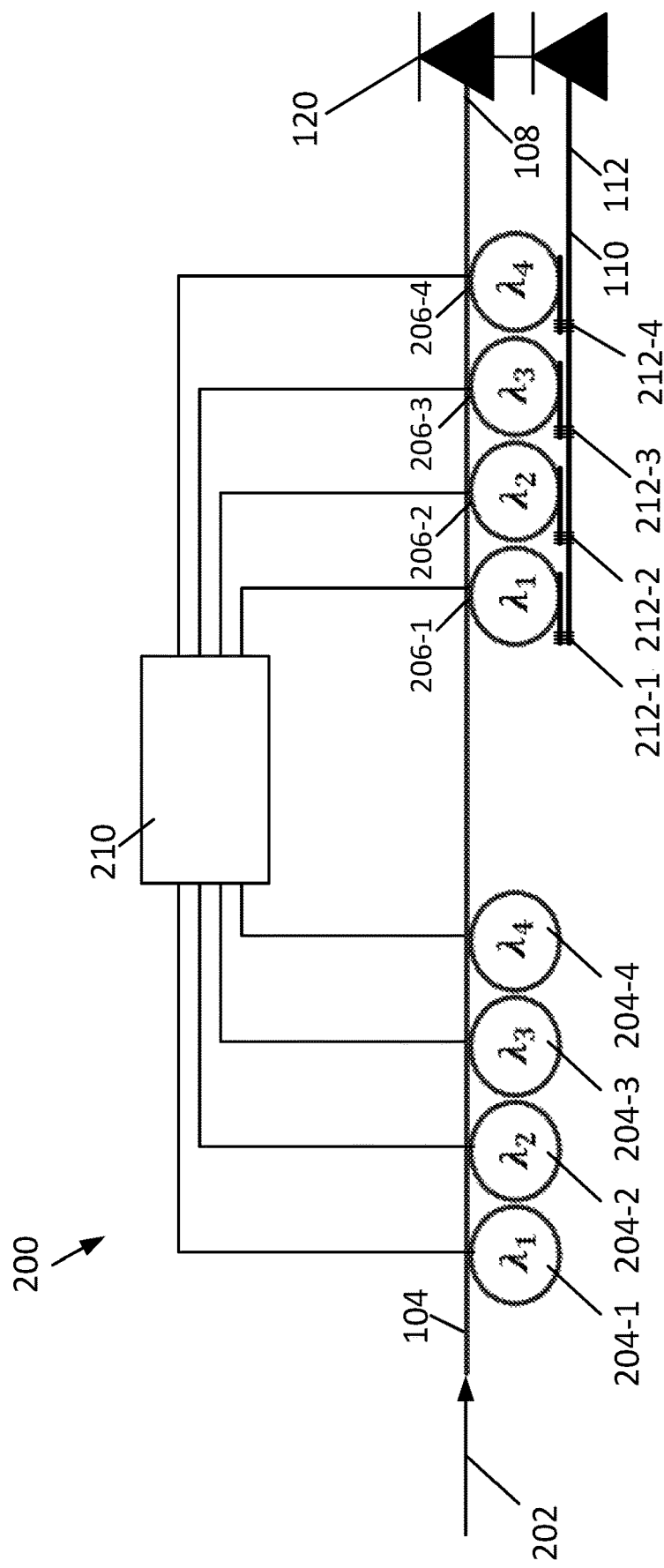
FIG. 17 shows yet a further embodiment of an ODPE in accordance with the present disclosure.

FIG. 17 shows another non-limiting embodiment of an ODPE 300 in accordance with the present disclosure. The ODPE 300 is similar to the ODPE 200 of FIG. 14 in that the ODPE 300 comprises the same elements except for the PDRs 208-1, 208-2, 208-3 and 208-4, which are absent from the ODPE 300. Instead, the ODPE 300 includes four contra-directional couplers 212-1, 212-2, 212-3 and 212-4. As will be understood by the skilled worker, a contra-directional coupler may comprise two waveguides with periodic perturbations to their refractive indexes configured to form an asymmetric coupler. The perturbations in the refractive indexes (refractive index gratings), are designed so that a specific wavelength is coupled from the forward propagating mode of the first waveguide to the backward propagating mode of the second waveguide.

The ODPE of the present disclosure can be implemented on any suitable material using any suitable process. For example, the ODPE of the present disclosure can be implemented on a silicon-on-insulator (SOI) platform or a silicon nitride (SiN) platform using either electron beam lithography or photolithography. The ODPE of the present disclosure may be fabricated using known technique and may have a monolithic construction. That is, the ODPE of the present disclosure may be monolithic. In other embodiments, the ODPE of the present disclosure may be on a separate chip.

Even though tunable ADFs discussed herein have a tunable MRR, this need not be the case. Embodiments where an ADF has a tunable optical resonator that is shaped differently than a tunable MRR, are to be considered within the scope of the present disclosure. For example, tunable optical resonators in the shape of racetracks are within the scope of the present disclosure.

Additionally, even though the PDRs and the tunable APFs discussed herein are ring shaped, this need not be the case. Embodiments where a PDR or a tunable APF is shaped differently than a ring, are to be considered within the scope of the present disclosure. For example, PDRs or tunable APFs in the shape of racetracks are within the scope of the present disclosure.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include a number of instructions that enable a computer device to execute operations for configuring or programming a digital logic apparatus in accordance with embodiments of the present disclosure.

Although the present disclosure and invention(s) associated therewith have been described with reference to specific features and embodiments, it is to be understood that various modifications and combinations can be made thereto without departing from such invention(s). The specification and drawings are, accordingly, to be regarded simply as an illustration of embodiments of the disclosure, for example as defined by the appended claims, and are contemplated to cover any and all modifications, variations, combinations or equivalents that fall within the scope of the present disclosure and its invention(s).

What is claimed is:

1. A photonic device, comprising:
   a first waveguide having an input port configured to receive an optical signal comprising M sub-signals each having a respective wavelength, M being an integer greater than or equal to two;
   a second waveguide;
   M tunable add-drop filters (ADFs) coupled to the first waveguide and to the second waveguide, each of the M tunable ADFs configured to receive a respective tuning signal, each of the M tunable ADFs producing a respective ADF delay of the respective one of the M sub-signals in accordance with a value of the respective tuning signal;
   M controllable optical delay elements (ODEs) coupled to the first waveguide, upstream from the M tunable ADFs, each controllable ODE of the M controllable ODEs configured to receive a respective control signal and to impart a respective controllable ODE delay to the respective one of the M sub-signals in accordance with a value of the respective control signal, each of the M sub-signals having associated thereto a respective combined delay equal to a sum of the respective ADF delay and the respective controllable ODE delay, each control signal configured to control each respective controllable ODE delay to produce a substantially same combined delay for each respective sub-signal of the M sub-signals.

2. The photonic device of claim 1, wherein each of the M tunable ADFs comprises:
   a respective tunable optical resonator coupled to the first waveguide; and
   a respective passive optical delay element coupled to the respective tunable optical resonator and to the second waveguide.

3. The photonic device of claim 2, wherein each controllable ODE comprises a respective controllable all-pass filter (APF).

4. The photonic device of claim 3, wherein the respective tunable optical resonator is a microring resonator or a racetrack resonator.

5. The photonic device of claim 2, wherein the respective passive optical delay is a microring delay element or a racetrack delay element configured to couple to the second waveguide with an efficiency greater than 95%.

6. The photonic optical device of claim 2, wherein the respective passive optical delay element is a contra-directional coupler.

7. The photonic device of claim 1, wherein the first waveguide has a first output port and the second waveguide has a second output port, the device further comprising a balanced photodetector coupled to both the first output port and to the second output port.

8. The photonic device of claim 7, wherein each tuning signal controls a splitting of an intensity of a respective one of the M sub-signals between the first output port and the second output port.

9. The photonic device of claim 1, wherein:
   the M tunable ADFs are spaced apart along the first waveguide and along the second waveguide, and
   the first waveguide and the second waveguide are configured to provide a respective same optical path length between any pair of adjacent tunable ADFs of the M tunable ADFs.

10. The photonic device of claim 9, wherein:
    each ADF of the M tunable ADFs comprises:
      a microring coupled to the first waveguide, and
      a passive delay ring coupled to the microring and to the second waveguide, and
    an optical path length between adjacent microrings is equal to an optical path length between adjacent respective passive delay rings plus a circumference of the passive delay ring configured to provide light to the other passive delay ring.

11. The photonic device of claim 1, further comprising a controller configured to provide the respective tuning signals to the M tunable ADFs and to provide the respective control signals to the M controllable ODEs.

12. The photonic device of claim 1, wherein the device is implemented on a silicon-on-insulator platform or on a silicon nitride platform.

13. The photonic device of claim 1, wherein:
    the device is an optical dot product engine (ODPE), and
    the M tunable ADFs define a weight bank of the ODPE.

14. The photonic device of claim 1, wherein the device is a monolithic device.

15. A photonic device, comprising:
    a first waveguide having an input port configured to receive an optical signal comprising M sub-signals each having a respective wavelength, M being an integer greater than or equal to two;
    a second waveguide;
    M tunable closed-loop optical resonators coupled to the first waveguide and configured to receive a respective tuning signal,
    M passive closed-loop delay elements, each the M passive closed-loop delay elements being coupled to a respective one of the M tunable closed-loop optical resonators and to the second waveguide, each of the M passive closed-loop delay elements and the second waveguide being configured to couple at least 95% of an optical signal propagating in any of the M passive closed-loop delay elements to the second waveguide.

16. The photonic device of claim 15, wherein:
    each of the M tunable closed-loop optical resonators includes a respective microring resonator, and
    each of the M passive closed-loop delay elements includes a respective passive delay ring.

17. The photonic device of claim 15, wherein:
    the first waveguide has a first output port positioned downstream from the M tunable closed-loop optical resonators,
    the second waveguide has a second output port positioned downstream from the M passive closed-loop delay elements, and
    each tuning signal controls a splitting of an intensity of a respective one of the M sub-signals between the first output port and the second output port.

18. A method, comprising:
    at a controller coupled to a plurality of tuned optical add-drop filters (ADFs) and to a corresponding plurality of controllable optical delay elements (ODEs),
      each controllable ODE having associated thereto a respective one of the plurality of tuned optical ADFs thereby forming a plurality of ADF/ODE pairs,
      each tuned optical ADF having associated thereto a respective ADF delay value,
      each controllable ODE having associated thereto a respective controllable ODE delay and a respective minimum ODE delay,
      each pair of the plurality of ADF/ODE pairs having associated thereto a combined delay equal to a sum of a respective ADF delay value and a respective controllable ODE delay:
      for each ADF/ODE pair,
        calculating a respective sum of the respective ADF delay value and of the respective minimum ODE delay value, to obtain a plurality of sums,
        obtaining a value of largest sum of the plurality of sums,
        controlling each controllable ODE to obtain a same combined delay for each of the plurality of ADF/ODE pairs, the same combined delay being equal to at least the value of the largest sum.

19. The method of claim 18, further comprising:
    at the controller, tuning each optical ADF of the plurality of optical ADFs, in accordance with pre-determined weights, to obtain the plurality of tuned optical ADFs.

20. The method of claim 19, wherein:
    each one of the plurality of tunable optical ADFs includes a respective tunable optical resonator, and
    tuning each optical ADF includes tuning each tunable optical resonator.

* * * * *

UNITED STATES PATENT AND TRADEMARK OFFICE
CERTIFICATE OF CORRECTION

PATENT NO. : 11,874,501 B1
APPLICATION NO. : 17/891276
DATED : January 16, 2024
INVENTOR(S) : Mitchell Nichols et al.

It is certified that error appears in the above-identified patent and that said Letters Patent is hereby corrected as shown below:

In the Specification

Column 8, Line 22, "comprised between -1 and +1 and for a step size of A between" should read -- comprised between -1 and +1 and for a step size of $\Delta$ between --.

Signed and Sealed this
Ninth Day of April, 2024

Katherine Kelly Vidal
*Director of the United States Patent and Trademark Office*